(12) United States Patent
Uomini

(10) Patent No.: US 8,635,292 B2
(45) Date of Patent: Jan. 21, 2014

(54) METHOD FOR REDUCTION OF DISK SPACE USAGE OF ELECTRONIC MESSAGES IN A NETWORK

(76) Inventor: Robert Uomini, Kensington, CA (US)

( * ) Notice: Subject to any disclaimer, the term of this patent is extended or adjusted under 35 U.S.C. 154(b) by 108 days.

(21) Appl. No.: 13/108,962

(22) Filed: May 16, 2011

(65) Prior Publication Data

US 2012/0296981 A1 Nov. 22, 2012

(51) Int. Cl.
*G06F 15/16* (2006.01)
(52) U.S. Cl.
USPC .............................. 709/206; 709/203; 709/217
(58) Field of Classification Search
USPC .................................. 709/203, 206, 217, 238
See application file for complete search history.

(56) References Cited

U.S. PATENT DOCUMENTS

| 5,813,008 | A | 9/1998 | Benson et al. |
| 5,815,663 | A | 9/1998 | Uomini |
| 7,020,779 | B1 * | 3/2006 | Sutherland .................... 709/206 |
| 7,257,645 | B2 * | 8/2007 | Wiser et al. ................... 709/238 |
| 2006/0149822 | A1 * | 7/2006 | Henry et al. ................... 709/206 |
| 2007/0073839 | A1 * | 3/2007 | Chung et al. .................. 709/217 |
| 2010/0287372 | A1 * | 11/2010 | Welin et al. ................... 709/203 |

OTHER PUBLICATIONS

"James Server", downloaded from http://www.apache.org/ on Dec. 30, 2011; 19 pages.

* cited by examiner

*Primary Examiner* — Quang N Nguyen
(74) *Attorney, Agent, or Firm* — Mintz Levin Cohn Ferris Glovsky and Popeo, P.C.

(57) ABSTRACT

A method for reducing the total amount of disk space used by multiple recipients of an electronic message in a communications network.

20 Claims, 2 Drawing Sheets

Sending a message

Fig. 1: Reading a message
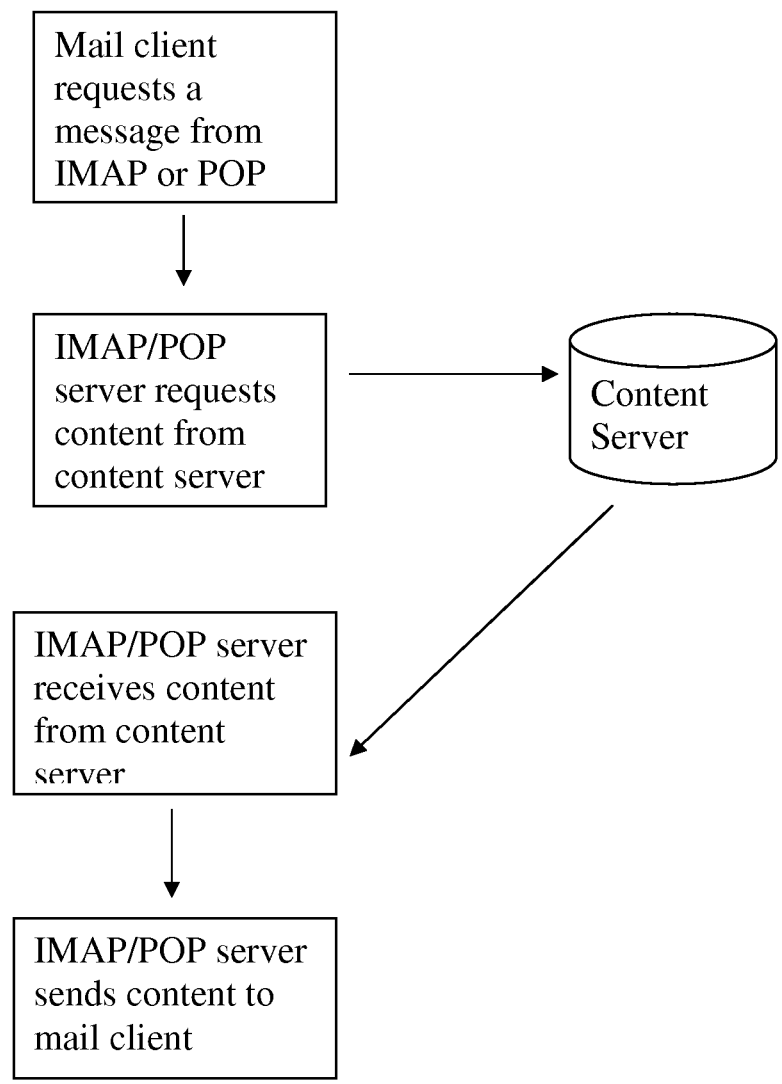

Fig. 2: Sending a message
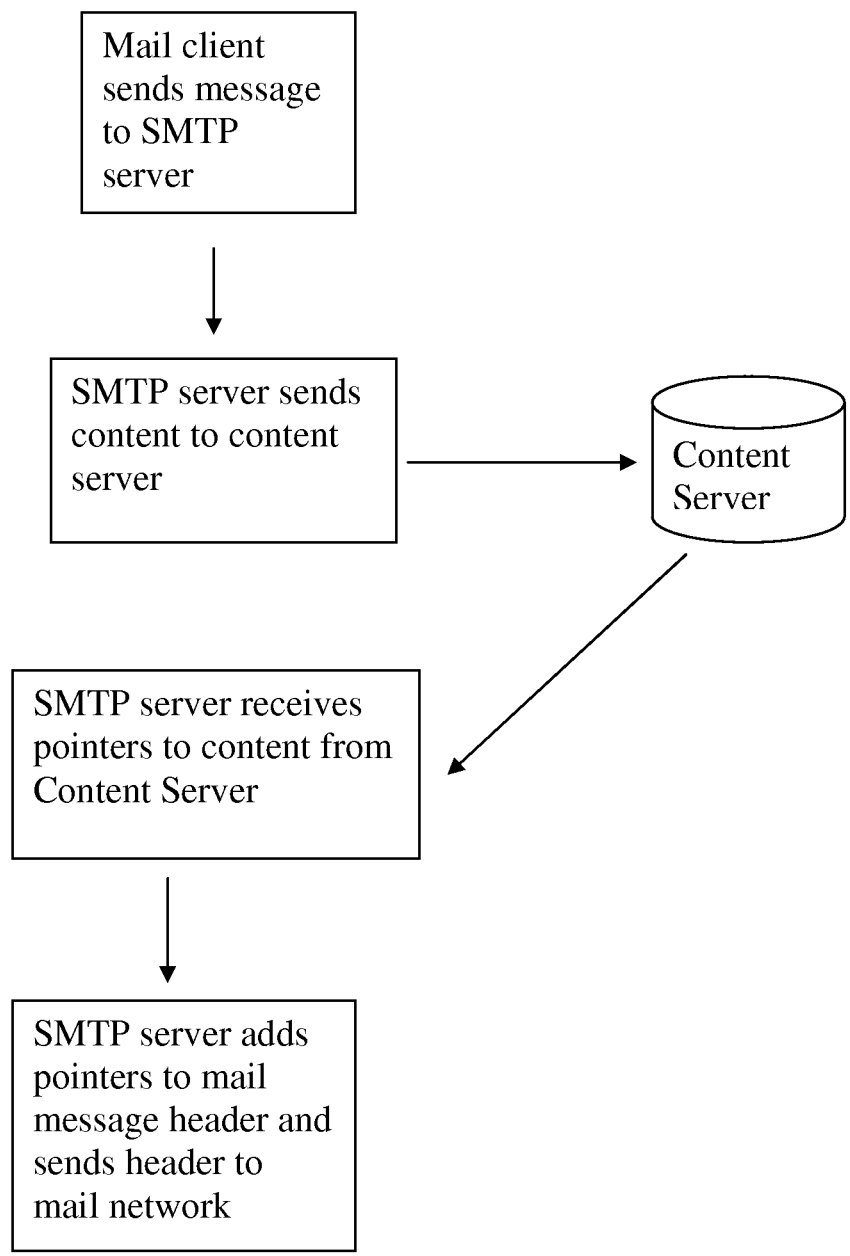

METHOD FOR REDUCTION OF DISK SPACE USAGE OF ELECTRONIC MESSAGES IN A NETWORK

TECHNICAL FIELD

This invention pertains to the field of sending and receiving electronic messages, such as e-mails, in communications networks.

BACKGROUND ART

Electronic messaging has become an essential form of communication in the age of the Internet. With the surge in usage of electronic media, such as e-mail, an increased burden has been placed on the resources needed to manage this data traffic, including data storage devices. Efficiencies in this area have come from many sources, including the technology described in the invention protected by U.S. Pat. No. 5,815,663 (Distributed posting system using an indirect reference protocol), referred to herein as "dynamic content".

One shortcoming of dynamic content technology, as applied to e-mail, is that all mail sent to multiple recipients assumes that recipient mail clients are enabled to read dynamic content mail. The present invention removes this requirement by moving the responsibility of dealing with dynamic content out of the mail client and into the outbound- and inbound mail servers. Thus, all mail clients are now able to participate in the advantages of dynamic content without requiring any modifications to the client.

DISCLOSURE OF INVENTION

This invention eliminates redundant electronic messages in a network caused by copying a message to multiple recipients without requiring code changes in the messaging client code. Specifically, a message sent by a user messaging client, such as an e-mail client, is received by a receiving server, such as an SMTP server, which then stores the message content with a content server. The content server returns a pointer to the content, as described in U.S. Pat. No. 5,815,663, which the receiving server then may insert into the message header, in place of the message content, before sending the message to the message recipients. When a recipient receives a message and wishes to read it, the associated inbound messaging server, such as an IMAP or POP mail server, uses the pointer contained in the message to retrieve the message content and return it to the recipient.

BRIEF DESCRIPTION OF THE DRAWINGS

These and other more detailed and specific objects and features of the present invention are more fully disclosed in the following specification, reference being had to the accompanying drawings, in which:

FIG. 1 is a flowchart illustrating a process of reading a message according to the present invention.

FIG. 2 is a flowchart illustrating a process of sending a message according to the present invention.

DETAILED DESCRIPTION OF THE PREFERRED EMBODIMENTS

The preferred implementation is for electronic mail and includes an SMTP server, and IMAP server (collectively, "mail servers") and a content server communicating with the mail servers via HTTP. In all that follows, our preferred implementation is based on the Apache James Server (see http://james.apache.org/ for details), modified to support the functionality as described herein. We define the operation of the outbound-(SMTP) and inbound (IMAP/POP) servers separately.

SMTP server

When a message is sent to the SMTP server, the server first checks to see which of the recipients are to be sent dynamic content; for example, this could be done via a configuration option. For recipients who are NOT to receive dynamic content, the server simply performs the usual SMTP functions and forwards the message to the appropriate mail relay server for that recipient. If the recipient is to receive dynamic content, the SMTP server sends to the content server one RECEIVE CONTENT request for each content component in the message and the content server returns pointers to the locations of the respective content components on the server; see the Appendix for the format of the RECEIVE CONTENT request. The pointer information includes numeric values corresponding to the content components in the content server database. This pointer information, along with the name and port number of the content server, are added to the mail message header and the header is sent to the recipient. Note that the message body is empty, in this implementation.

See FIG. 2: Sending a message.

IMAP/POP server

When a user of a mail client wishes to view a mail message in the user's inbox, the user typically selects the message to be viewed from within a window that displays certain summary information about the message, such as the date received, the sender e-mail address or name, and the message subject. The mail client sends a request to the IMAP or POP server to retrieve the message body and this in turn causes the IMAP/POP server to query the message header for dynamic content information. If there is none, it is assumed that the message requested does not contain dynamic content and the IMAP or POP server performs the usual function of fetching and returning the content. If the pointer information is present, it is retrieved and used to format a FETCH CONTENT request (described in the Appendix) to the content server, who returns the desired content. Similarly, if a dynamic content attachment is selected for viewing, the pointer for the attachment is used in the FETCH CONTENT request.

See FIG. 1: Reading a message.

The above description is included to illustrate the operation of the preferred embodiments, and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method of sending electronic messages in a messaging network, the method comprising the steps of:

sending an electronic message including message content to one or more message recipients using an arbitrary messaging client, such as a mail client, to an outbound messaging server, such as an SMTP server;

the outbound messaging server sending the message content of the electronic message to a content server not residing on the same machine as the outbound messaging server, and receiving one or more integer pointers including numeric values corresponding to content components of the message content from the content server;

the outbound messaging server adding the one or more integer pointers to message headers for the one or more message recipients of the electronic message; and the outbound messaging server sending the resulting electronic message to the messaging network.

2. The method of claim 1, wherein a standard ("canned") message is included in a message body before the message is sent to the messaging network.

3. The method of claim 1, wherein the electronic message contains no attachments.

4. The method of claim 1, wherein the electronic message contains one or more attachments.

5. The method of claim 1, wherein no content is included in the electronic message before the electronic message is sent to the messaging network.

6. The method of claim 1, wherein an original message is included in the electronic message before the electronic message is sent to the messaging network.

7. The method of claim 1, wherein a customized message is included in the electronic message before the electronic message is sent to the messaging network.

8. The method of claim 1, wherein the messaging client resides on a desktop device.

9. The method of claim 1, wherein the messaging client resides on a mobile device.

10. The method of claim 1, wherein the messaging client resides on a laptop device.

11. The method of claim 1, wherein the outbound messaging server resides on a mobile device.

12. The method of claim 1, wherein the outbound messaging server resides on a desktop device.

13. The method of claim 1, wherein the outbound messaging server resides on a laptop device.

14. The method of claim 1, wherein the outbound messaging server resides on a server device.

15. A method of sending electronic messages in a messaging network, the method comprising:

receiving an electronic message including message content at a server configured for outbound messaging;

sending the message content to a content server for storage;

receiving one or more integer pointers including numeric values corresponding to content components of the message content at the server configured for outbound messaging from the content server, the one or more integer pointers configured to effect retrieval of the message content when a message recipient selects the electronic message for viewing;

inserting the one or more integer pointers into a header of the electronic message at the server configured for outbound messaging; and sending the electronic message with the header to at least one message recipient.

16. The method of claim 15, wherein the one or more integer pointers are further configured within the header to be queried by a server configured for inbound messaging.

17. The method of claim 16, wherein the one or more integer pointers are further configured to enable the server configured for inbound messaging to retrieve the message content.

18. The method of claim 15, wherein a canned message is included in the electronic message before the electronic message is sent to the at least one message recipient.

19. The method of claim 15, wherein message content is not included in the electronic message when the electronic message is sent to the at least one message recipient.

20. The method of claim 15, wherein a customized message is included in the electronic message before the electronic message is sent to the at least one message recipient.

\* \* \* \* \*